Patented Apr. 10, 1934

1,954,469

UNITED STATES PATENT OFFICE 1,954,469

PROCESS FOR MAKING BENZIDINE AND OTHER ARYLAMINES

Charles F. Booth, Anniston, Ala., assignor to Swann Research, Incorporated, a corporation of Alabama No Drawing. Application April 28, 1930, Serial No. 448,175

4 Claims. (Cl. 260—130.5)

This invention relates to a process for making arylamines by reacting between the corresponding halogenated aromatic hydrocarbon and ammonia. It further relates to a process for producing benzidine by reacting 4, 4' dichlordiphenyl with ammonia.

The object of this invention is to provide a means by which this reaction can be carried out in ordinary steel vessels without resorting to expensive vessels or linings for steel vessels in order to resist the corrosive action of the reaction mixture.

It is well known that cuprous salts are effective catalysts in promoting the reaction of chlorbenzol to aniline in the presence of ammonia. This has been demonstrated by A. J. Quick, Journal Am. Chem. Soc., 42, 1033 (1920). More recently Hale and Britton have disclosed (U. S. patent, Reissue No. 17,280) that cuprous chloride or other cuprous salt in combination with copper metal is effective in catalyzing this reaction. They have particularly pointed out that the copper metal can be effectively utilized in this reaction as a promoter for the cuprous salt when the reaction is carried out in tubes or autoclaves lined with copper.

In my researches on the production of benzidine by the ammonolysis of 4, 4' dichlorodiphenyl, I have found, as has Quick in other reactions above referred to, that a cuprous salt is a very efficient catalyst for this reaction, giving close to 100 per cent yields of benzidine. I found, however, that the reaction mixture is very corrosive to ordinary steel, as well as to the special steels containing large amounts of chromium and other resistant elements commonly employed. The prime object of my invention, therefore, is to apply this catalyst to the production of benzidine, or other arylamines, in a manner whereby the reaction may be carried out in steel containers without the corrosion difficulties heretofore encountered.

I have found after a considerable amount of research that although the reaction mixture of halogenated aromatic hydrocarbons and ammonia contains an excess of ammonia, there is, due to causes of which I am not at present certain, excessive corrosion of the walls of steel containers. I have further found that by the addition of such bases as the alkaline earth metal oxides or hydroxides, or the alkali metal hydroxides, a reaction mixture is provided which is surprisingly non-corrosive to ordinary steels. Furthermore, the yields of the amino compounds are not seriously, if at all, reduced by the formation of the corresponding hydroxy compound.

The method of producing the arylamines, embodying my discovery, will be illustrated by the following examples:

The formation of benzidine depends upon the following reactions:—

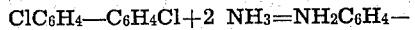
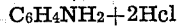
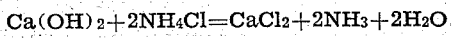

ClC₆H₄—C₆H₄Cl+2 NH₃=NH₂C₆H₄—C₆H₄NH₂+2Hcl

2NH₃+2HCl=2NH₄Cl

Ca(OH)₂+2NH₄Cl=CaCl₂+2NH₃+2H₂O

The following proportions of material are suitable for carrying out the reaction:

| | | |
|---|---|---|
| 4,4' dichlorodiphenyl | 20.0 | grams |
| Cuprous chloride | 2.0 | grams |
| Lime 97% Ca(OH)₂ | 6.83 | grams |
| Ammonia water 33.35% | 51.4 | cc. |

The above materials are loaded into a steel autoclave of 100 cc. capacity, constructed to withstand a pressure of 100 to 300 atmospheres. The temperature is raised to 225–230° C. and maintained at this point for 8 hours. During the heating period, the charge is agitated either by revolving the autoclave or by a mechanical stirrer without the vessel. On cooling the autoclave, the charge is removed and the benzidine separated by extraction with benzene and precipitation as the sulphate, by adding sulphuric acid to the benzene solution. On analysis, the product will be found to be equivalent to a yield of 99 to 99.5% of the theory. At the same time the steel of the autoclave will be found to have been unattacked.

In place of lime, I may use other alkalis, such as the alkali hydroxides and carbonates or alkaline salts, such as trisodium phosphate. The use of sodium hydroxide is effective in preventing corrosion of the steel container, however, a lower yield of benzidine results, since hydroxy compounds such as 4,4' dihydroxydiphenyl or 4-hydroxy-4' aminodiphenyl are formed at the same time. The use of trisodium phosphate results in a good yield of the amino compound and prevents corrosion of the steel container.

In place of cuprous chloride, I may use other cuprous compounds, such as the oxide, hydroxide, iodide, bromide. I have found that traces of cupric compounds in the cuprous compounds are not particularly deleterious. In fact, I believe them to be merely inert substances as far as this reaction is concerned.

I have also used this process for the production of other arylamines, such as the arylamines of the benzene and the diphenyl series. For example, reactions of the following types may be carried out:—

1. Chlorobenzene with ammonia and cuprous chloride in the presence of lime yields aniline.

2. Dichlorobenzene with ammonia and cuprous chloride in the presence of lime yields phenylenediamine.

3. Chlortoluene with ammonia and cuprous chloride in the presence of lime yields toluidine.

4. Chloronaphthalene with ammonia and cuprous chloride in the presence of lime yields napthylamine.

5. Chlordiphenyl with ammonia and cuprous chloride in the presence of lime yields aminodiphenyl.

6. Substituted 4—4' dichlorodiphenyl with ammonia and cuprous chloride in the presence of lime yields substituted benzidine.

In all of these cases, the amount of lime used is that necessary to combine with the chlorine with the formation of calcium chloride. These reactions can be carried out in ordinary steel pressure vessels.

The proportion of ammonia used in the reaction mixture is several times as much as is necessary to replace the halogen in the hydrocarbon. I prefer to use 5 or 6 times as much and have used even still greater excesses.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A process of making benzidine which comprises mixing 4—4' dichlorodiphenyl, cuprous chloride, lime and ammonia with water, and autoclaving the mixture with agitation under superatmospheric pressure at a temperature between 225 and 230° C. for a period of approximately eight hours.

2. In the process of making an aminodiphenyl comprising heating the corresponding chlorodiphenyl with ammonia, the improvement which consists in carrying out the process under superatmospheric pressure with an excess of from three to six times as much ammonia as is necessary to react with chlorine in the chlorodiphenyl in the presence of a base selected from at least one of a group of bases consisting of alkaline earth metal oxides, hydroxides, and alkali metal hydroxides and alkali metal basic salts.

3. A process of making an aminodiphenyl comprising heating to about 230° C. under superatmospheric pressure the corresponding chlorodiphenyl with an excess of from three to six times as much ammonia as is necessary to react with the chlorine of the chlorodiphenyl in the presence of an inorganic cuprous compound and a base selected from at least one of a group of bases consisting of alkaline earth metal oxides and hydroxides, and alkali metal hydroxides and basic salts.

4. In the process of making benzidine which comprises heating 4—4' dichlorodiphenyl, cuprous chloride, and ammonia, the improvement which consists in carrying out the process under superatmospheric pressure with an excess of from three to six times the ammonia theoretically necessary to react with the chlorine in the chlorodiphenyl in the presence of a base selected from at least one of a group of bases consisting of alkaline earth metal oxides and hydroxides and alkali metal hydroxides and alkali metal basic salts.

CHARLES F. BOOTH.